Jan. 14, 1958 W. GOTTWALD 2,820,114
ROLLER CONTACT CURRENT CONVERTER
Filed July 6, 1953 3 Sheets-Sheet 2

The Inventor:

Jan. 14, 1958 W. GOTTWALD 2,820,114
ROLLER CONTACT CURRENT CONVERTER
Filed July 6, 1953 3 Sheets-Sheet 3

The Inventor:

United States Patent Office 2,820,114
Patented Jan. 14, 1958

2,820,114

ROLLER CONTACT CURRENT CONVERTER

Walter Gottwald, Ratingen, near Dusseldorf, Germany, assignor to August Hamilton Schilling, Atherton, Calif.

Application July 6, 1953, Serial No. 366,297

Claims priority, application Germany August 4, 1952

11 Claims. (Cl. 200—19)

This invention relates to roller contact current converters and has reference particularly to mechanical roller contact current converters in which the roller contacts roll on circular paths.

With mechanical current converters having roller contacts which roll on circular paths it is desired that the rollers remain along their entire axial widths in contact with the contact path. Also constructions are known which provide two contact paths arranged in parallel, i. e. in superposed relation and in axial aligment, and connected electrically by means of revolving roller contacts. In this case it is absolutely necessary that the rollers connecting both paths have continuous contact with these two paths along the full axial widths of the latter. Since the roller contacts are preferably fixedly journalled their axis of rotation is fixed and therefore it becomes extremely difficult to fulfill the mentioned requirement.

The present invention has for one of its objects to provide current converters of the type referred to above having special contact rings arranged elastically on the rolling roller contacts, thus enabling these contact rings to take any position that may be required in order to maintain contact with the single contact path straps. Rubber or other elastic material may be used to provide the elastic support for these contact rings. The desired effect can be realized, for instance, by supporting the contact ring preferably on a rubber ring or the like arranged in the center, in such manner that the ring is able to assume a position oblique to the axis of rotation of the rollers. However, it is possible to provide several, especially two contact rings which are connected with each other by means of flexible current conductive straps and wherever each ring is carried by a rubber ring or the like. This type of arrangement is recommendable in particular in such cases where two contact paths are to be connected by means of roller contacts.

The contact rings and the rubber rings can be joined with each other by means of polymerization. Expediently the rubber ring on its part is polymerized to a carrier ring. Tensile stresses are then present in the rubber ring; said stresses result from the shrinkage of the rubber on being cooled down after the polymerization process. These tensile stresses influence in undesirable manner the junction formed of rubber and metal and decrease the stability to aging of the rubber. In addition the rubber ring is strained by the rotation of the roller contact in each case on the one side, and the consequence is that, because of the rigidity of the contact ring, on the opposite side tensile stresses arise which are the greater the higher the contact pressure against the contact ring is chosen. Thus, the tensile stresses which arise strive toward loosening the rubber ring from the contact ring.

Therefore, it is a further object of the present invention to provide means for eliminatnig these disadvantages. According to the invention a rubber cushioning arrangement designed for carrying the contact rings is put under initial tension or compression. Without further difficulties it can be realized in this manner that said rubber cushioning is not subject to any disadvantageous tensile stresses during operation. This objective can be accomplished in various ways. For instance, the rubber cushioning can by suitable means be put under pressure in the radial direction of the contact ring. Advantageously, in this case the construction is as follows: The soft rubber cushioning formed by a closed type ring is provided with an interrupted inner ring preferably joined to it by polymerization, consisting of metal or any other suitable material and force-fitted onto a carrying body whose outside diameter is larger by the magnitude of the desired initial stress than the inner diameter of said ring. Another possibility for production of the desired initial tensile or compressed stress is that the rubber cushioning is compressed by suitable means in the direction of the axis of the ring. As rubber practically is not compressible, the applied pressure becomes effective in such manner that an initial stress is produced between said two rings.

To these and other ends, the invention consists in the construction and arrangement of parts that will appear clearly from the following description when read in conjunction with the accompanying drawings, the novel features being pointed out in the subjoined claims.

In the drawings:

Fig. 7 illustrates a further embodiment of such an arrangement, while

Figure 8:
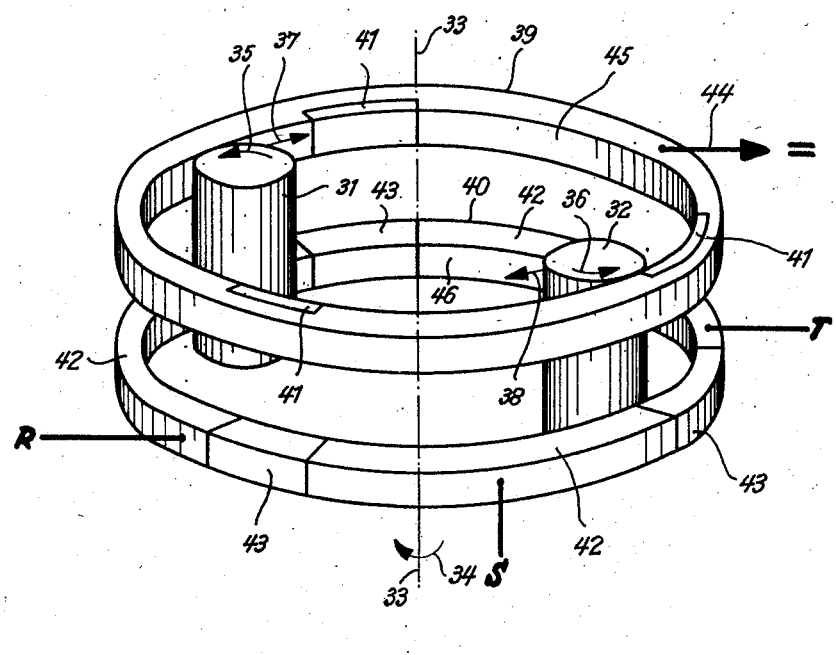

Fig. 8 finally illustrates diagrammatically and in perspective the principle of construction of a roller contact current converter adapted for conversion of three-phase A. C. into direct current.

Figure 1:
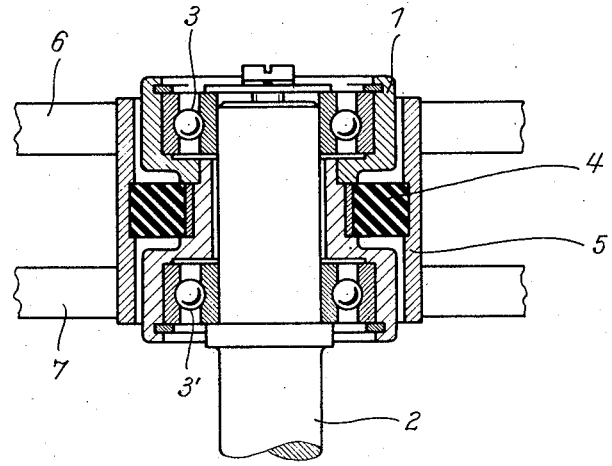
Fig. 1 represents a sectional view of a roller shell according to the invention provided with a shoft rubber cushioned contact ring.

Referring to Fig. 1, a roller shell 1 is carried on an axle 2 by means of the ball bearings 3 and 3'. A rubber ring 4 carrying the contact ring 5 is provided on the roller shell 1. The numerals 6 and 7 designate the two contact paths on which the roller electrode 1, 4, and 5 runs when the rectifier is in operation. The contact surface 5 has, by means of the presence of the rubber ring 4, self-aligning capacity within certain limits and independently of the axle 2 to the extent that a good contact is ensured at all times with the contact paths 6 and 7.

Figure 2:
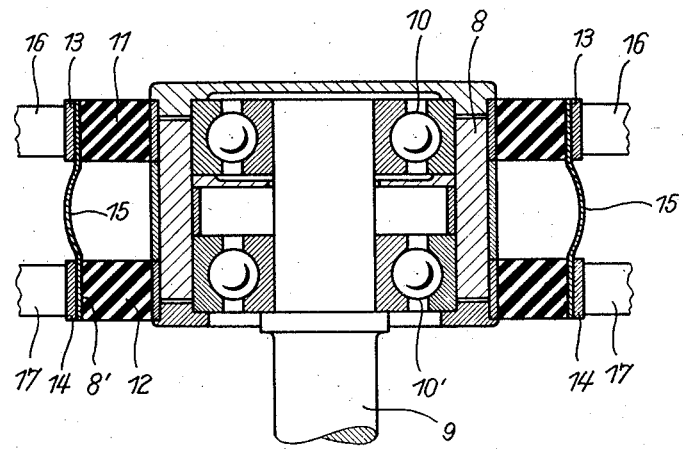
Fig. 2 shows likewise in section a roller shell according to the invention differing from the type shown in Fig. 1 in that there are provided two rubber cushioned contact rings.

Figure 2 represents a somewhat altered construction. In this case again a roller shell 8 is provided which is rotatably arranged on an axle 9 by means of the ball bearings 10 and 10'. In this figure the roller shell carries two rubber rings 11 and 12 which are encompassed by the contact rings 13 and 14. The contact rings 13 and 14 are connected current conductively with each other by means of the flexible conductor straps 15. Thus, during rolling of the arrangement on the contact paths 16 and 17, each contact path 13 and 14 has the possibility of self-alignment independently of the other contact path. Thereby, a perfect contacting occurs on both paths even if the axle 9 should not be positioned in proper direction or inaccuracies should be present in the contact paths 16 and 17, and thus continuous connection of the contact paths place properly in each position of the arrangement.

Figure 3:
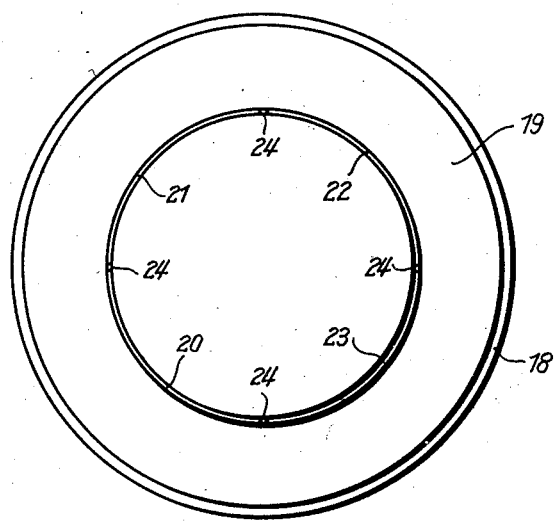
Fig. 3 is a plan view of a contact path fixedly connected with a rubber ring and provided with an inside metal ring consisting of several segments.

Referring now to Figure 3, the numeral 18 designates a contact path consisting of metal and fixedly connected with the rubber ring 19, for example, by polymerization or vulcanization. On its inner side the rubber ring 19 is likewise connected by polymerization with a metal ring consisting of segments 20 to 23 which are interrupted by gaps 24. The gaps 24 make it possible to force the entire arrangement onto a carrying body (for example, the roller shell 8 according to Fig. 2) having an outer diameter larger than the inside diameter of the ring 20 to 23. Thereby in the rubber ring 19 an initial tension is produced which the rubber ring transmits to the contact path 18. Therefore, tensile stresses which were present in the rubber will be compensated and can no more act disadvantageously on the connection between rubber and metal. The result is also attained that during the run of the rolling arrangement no or only small tensile stresses arise on the side of the ring lying opposite to the pressure side, and said small tensile stresses are not able to cause loosening of the connection between contact path 18 and rubber ring 19. The inside ring 20 to 23 can be polymerized (vulcanized) in separated condition to the rubber ring, or it can be provided with gaps after the polymerization process has been carried out.

Figure 4:
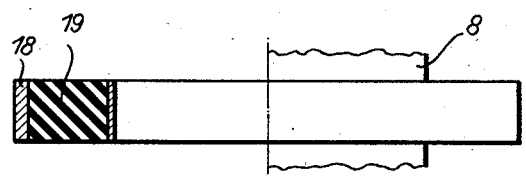
Fig. 4 shows the arrangement according to Fig. 3 partly in sectional view and partly in side elevation.

In Figure 4 the arrangement according to Fig. 3 is represented in sectional view and partly in side elevation. In the right half of the figure a part 8 receiving the rolling body is indicated.

Figure 5:
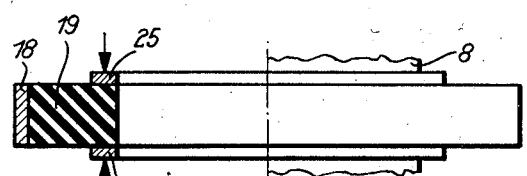
Fig. 5 illustrates another possibility for production of initial compressive stress in the rubber ring.
Figure 6:
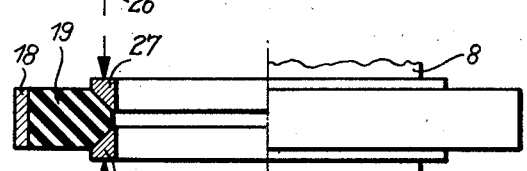
Fig. 6 illustrates still another embodiment of an arrangement for production of initial compressive stress in the rubber ring.
Figure 7:
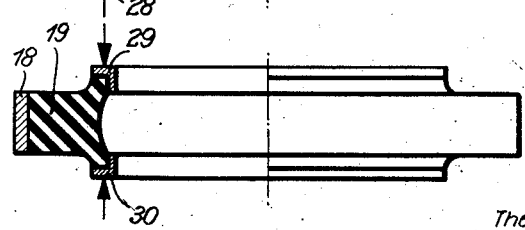

Other possibilities for production of initial tensions in the rubber ring 19 are shown in the Figures 5 to 7. In this exemplified representation the initial tensions are produced by compressing the rubber ring 19 in axial direction. In the example given in Fig. 5 this is done by means of two flat annular disks 25 and 26. It can be recognized without difficulty that the material that the rubber ring 19 consists of, since it is practically incompressible, is sustained with pressure on the one hand against the contact ring 18 and against the carrying body 8 on the other, if the rings 25 and 26 are pressed together in the direction of the arrows.

The construction according to Figure 6 provides pressure rings having slanted surfaces in place of rectangular surfaces. The rubber material is put under pressure in axial as well as in radial direction, if these rings shown at 27 and 28 are pressed toward each other. Also, as represented in Figure 7, pressure rings having angular cross-section may be used advantageously. With this construction, the rubber ring 19 is sustained only on its inner side by the rings 29 and 30 without exerting any pressure onto the carrying body. Practically the same effect results from the arrangement of pressure rings having slanted surfaces as shown in Figure 6, while the example given in Figure 5 provides that the rubber ring under initial tension bears against the carrying body 8.

Fig. 8 of the drawings shows in perspective the general arrangement of a roller contact current converter adapted to convert three-phase current into direct current. There are provided two annular contact surfaces 45 and 46 which are electrically connected by means of the rollers 31 and 32. In this case the rollers 31 and 32 are designed in the same manner as the rollers 1, 4, 5 in Figure 1, and for the sake of clearness, the details of the roller construction have been omitted. The shafts 2 of the contact rollers are mounted on the opposite ends of a diametrically extending arm (not shown) which is rigidly connected to a drive shaft (not shown) whose axis is indicated at 33—33 and which is rotated in the direction of the arrow 34 by means of a synchronous motor (not represented in the drawing). Thus the rollers 31 and 32 rotate in the direction of the arrows 35 respectively 36 about their own axes and travel on the contact paths 45, 46 in the direction of the arrows 37 and 38. The contact paths 45 and 46 are formed by the rings 39 and 40. The ring 39 is a closed type metal ring with laid-in segments 41 consisting of insulating material, while the ring 40 consists of three metal pieces 42 which are interrupted by pieces 43 made of insulating material. The three phase lines R, S, T of a rotary current power line are connected to the metal pieces 42 of the ring 40. The D. C.-line (=) 44 leads off from the closed ring 39. Each of the metal segments 42 extends over 90 degrees of the circle, while the insulating segments 43 extend over 30 degrees each. In this example it is assumed that a rotary current having 50 cycles is to be converted into direct current. The revolution speed of the synchronous motor and the speed of the rollers 31 and 32 on the contact paths 45 and 46 about the axis 33—33 is then 1,500 R. P. M. During revolution of the rollers the segments 42 will be conducted by means of the rollers 31, 32 one after the other with the D. C.-collector ring 39, thus supplying current to the latter in one direction only, and thus establishing a three-phase commutation operation. There is the advantage with the insulating pieces 43 that the switching period can be adjusted by relative rotation of the rings 39 and 40 with reference to each other.

It is understood that roller arrangements according to Figures 1 and 2 also can be applied successfully with types of construction of roller contact current converters which may differ from the arrangement as shown in Figure 8 and that the invention is not limited to this preferred example of application.

I claim:

1. Roller contact current converter comprising, in combination, two concentric rings having electrically conducting arcuate portions at least along part of their peripheries, at least one of said concentric rings including an insulating arcuate portion adjoining a conducting arcuate portion, roller contact means supported for rolling on said concentric rings and periodically bridging said rings electrically, the support for said roller contact means comprising a shaft about whose axis the roller contact means is rotatable, said shaft being bodily rotatable about the axis of said concentric rings, a rotating support on the shaft for the roller contact means, and yielding means disposed between and firmly connected to the roller contact means and to its rotating support and enabling such contact means to assume oblique positions to maintain continuous contact with both concentric rings despite irregularities in the surfaces of said rings, the peripheral extent of said insulating portion being such that the roller contact means at no time bridges the insulating portion to make contact simultaneously with the conducting portions bordering the same.

2. A converter according to claim 1, wherein said yielding means comprises a ring of soft rubber bonded to the roller contact means and to its support.

3. A converter according to claim 2, wherein the rubber body is bonded to the contact means and its support by polymerized intermediate layers.

4. A converter according to claim 1, wherein the yielding means comprises a ring of soft rubber bonded to the roller contact means and its support, said rubber ring, support and contact means constituting a body of rotation rotating about the axis of the shaft, said rubber ring being of less axial extent than said roller contact means and being arranged at the middle of the axial length of said contact means.

5. A converter according to claim 1, wherein the roller contact means is composed of two axially spaced contact rings, and wherein said yielding means comprises soft rubber rings disposed between said contact rings and the rotatable support, said rubber rings being bonded to said contact rings and their support, and flexible metallic straps connecting the said contact rings elastically.

6. A converter according to claim 5, wherein said rubber rings are disposed in axially spaced relation and are axially coextensive with the roller contact rings.

7. A converter according to claim 1, including an anti-friction bearing having inner and outer races, the inner races being secured to the shaft, the support for the roller contact means comprising a cylindrical shell secured to and rotating with the outer race of the bearing, said yielding means comprising an annular soft rubber body bonded at its inner surface to the said shell and at its outer surface to the said roller contact means.

8. A converter according to claim 1, wherein said yielding means comprises an annular body of soft rubber bonded to the contact means and to its support, said rubber body being under a constant pre-compression, whereby the development of tensile stresses in said body is prevented.

9. A converter according to claim 1, wherein said yielding means comprises an annular body of soft rubber bonded to the contact means and to its support, and means for producing a continuous pre-compression in said rubber body for preventing the development of tensile stresses therein.

10. A converter according to claim 1, wherein said yielding means comprises an annular body of soft rubber bonded to the contact means and to its support, said support comprising an anti-friction bearing on the shaft and a cylindrical sleeve composed of segment-shaped parts having gaps therebetween and secured to said bearing, said rubber body having before assembly an inner diameter which is smaller than the outer diameter of its assembled support.

11. In a rotary contact current converter, the combination with a pair of concentric, axially spaced circular rings at least one of which has at least one arcuate conducting portion and as many arcuate insulating portions bordering the conducting portion or portions, of a shaft rotatable about the axis of said rings, a roller mounted for rotation on said shaft and including a contact ring bearing on and rolling on said circular rings, and a distortable, elastic, continuous rubber ring between said roller contact ring and the shaft, said rubber ring being under a compressive prestress to cause it to exert a continuous pressure against the inside face of the roller contact ring, the peripheral extent of any insulating portion of the circular ring being such that the roller contact ring at no time bridges the insulating portion to make contact simultaneously with the conducting surfaces bordering the same.

References Cited in the file of this patent

UNITED STATES PATENTS

| | | |
|---|---|---|
| 547,537 | Biddle et al. | Oct. 8, 1895 |
| 1,404,761 | Harris et al. | Jan. 31, 1922 |
| 1,915,530 | Hoisington et al. | June 27, 1933 |
| 2,133,980 | Fowler | Oct. 25, 1938 |
| 2,268,261 | Merkel | Dec. 30, 1941 |

FOREIGN PATENTS

| | | |
|---|---|---|
| 142,578 | Great Britain | May 13, 1920 |